US012232239B2

(12) United States Patent
Tan et al.

(10) Patent No.: US 12,232,239 B2
(45) Date of Patent: Feb. 18, 2025

(54) HEATING DEVICE AND CONTROL METHOD THEREOF

(71) Applicant: DELTA ELECTRONICS, INC., Taoyuan (TW)

(72) Inventors: Thiam-Wee Tan, Taoyuan (TW); Cheng-Chung Li, Taoyuan (TW); Chun Chang, Taoyuan (TW); Yu-Min Meng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/488,011

(22) Filed: Oct. 16, 2023

(65) Prior Publication Data

US 2024/0049365 A1 Feb. 8, 2024

Related U.S. Application Data

(62) Division of application No. 17/037,599, filed on Sep. 29, 2020, now Pat. No. 11,825,584.

(30) Foreign Application Priority Data

Jul. 8, 2020 (CN) ........................ 202010653172.4

(51) Int. Cl.
*H05B 6/06* (2006.01)
*H05B 6/04* (2006.01)

(52) U.S. Cl.
CPC ............... *H05B 6/062* (2013.01); *H05B 6/04* (2013.01); *H05B 2206/02* (2013.01)

(58) Field of Classification Search
None
See application file for complete search history.

(56) References Cited

U.S. PATENT DOCUMENTS

2008/0203087 A1* 8/2008 Schilling ................ H05B 6/062 219/600
2010/0006563 A1* 1/2010 Schilling ................ H05B 6/062 219/661
2013/0243120 A1 9/2013 Tsai et al.

FOREIGN PATENT DOCUMENTS

CN 103931272 A 7/2014
CN 107027202 A 8/2017
CN 109870616 A 6/2019
WO 2018150614 A1 8/2018

* cited by examiner

*Primary Examiner* — Dana Ross
*Assistant Examiner* — Kuangyue Chen
(74) *Attorney, Agent, or Firm* — CKC & Partners Co., LLC

(57) ABSTRACT

A heating device includes a first capacitor, a first switch, a second switch, a second capacitor, a third capacitor, a coil and a controller. The first and second switch are coupled in series at a first node, and are coupled with the first capacitor in parallel. The second capacitor is coupled to the first switch. The third capacitor is coupled to the second switch, and is coupled to the second capacitor at a second node. The coil is coupled between the first and the second node. The controller outputs a first and a second control signal to the first switch and the second switch, respectively. After the heating device received a voltage and a starting command, the controller outputs the first and the second control signal to turn on or off the first and the second switch respectively. The duty cycle of the first signal is lower than 50%.

6 Claims, 11 Drawing Sheets

200

HEATING DEVICE AND CONTROL METHOD THEREOF

RELATED APPLICATION

This application is a divisional application of U.S. patent application Ser. No. 17/037,599, filed Sep. 29, 2020, which claims priority to China Application Serial Number 202010653172.4, filed Jul. 8, 2020, all of which are herein incorporated by reference in their entireties.

BACKGROUND

Technical Field

The present disclosure relates to a heating device and control method thereof. More particularly, the present disclosure relates to a noise cancellation heating device and control method thereof.

Description of Related Art

In present technology, the circuit architecture applied to induction cooker includes multiple capacitors. When the induction cooker is initiated, the pot placed on the coil of the induction cooker vibrates and generates noise because the instantaneous current flowing through the coil when the capacitor is discharged is too large, which will reduce the quality of use.

SUMMARY

In order to solve the problem mentioned above, one aspect of the present disclosure is to provide a heating device which includes a first capacitor, a first switch, a second switch, a second capacitor, a third capacitor, a coil and a controller. The first capacitor is coupled to the power source. The second switch is coupled to the first switch in series at a first node, and the first switch and the second switch are coupled with the first capacitor in parallel. The second capacitor is coupled with the first switch in parallel. The third capacitor is coupled to the second switch, and is coupled to the second capacitor in series at a second node. The coil is coupled between the first node and the second node, and is configured to generate the induced magnetic field. The controller is configured to output a first control signal and a second control signal to the first switch and the second switch, respectively, in which the first control signal and the second control signal are complementary to each other. In an initial period after the heating device receives the voltage and a starting command, the controller outputs the first control signal to turn on or off the first switch, and outputs the second control signal to turn on or off the second switch, in which the duty cycle of the first signal is lower than 50%, such that the first capacitor can be discharged through the first switch which is turned on, the coil and the third capacitor.

Some aspects of the present disclosure provide a heating device control method, in which the heating device includes a first switch, a second switch, a first capacitor, a second capacitor, a third capacitor, a coil and a controller, the heating device generates an induced magnetic field according to a voltage provided by a power source, the second switch is coupled to the first switch in series at a first node, the first capacitor is coupled to the power source and is coupled with the first switch and the second switch in parallel, the second capacitor is coupled with the first switch in parallel, the third capacitor is coupled to the second switch and is coupled to the second capacitor in series at a second node, the coil is coupled between the first node and the second node and is configured to generate the induced magnetic field, the controller is coupled to the first switch and the second switch, the control method includes the following operations. The voltage is received by the heating device. After receiving a starting command a first control signal is outputted by the controller to turn on or off the first switch, and a second control signal is outputted by the controller to turn on or off the second switch, to perform a discharging process, in which the first control signal and the second control signal are complementary to each other, and the duty cycle of the first control signal is lower than 50%, such that the first capacitor can be discharged through the first switch which is turned on, the coil and the third capacitor. Whether a period of the discharging process is longer than a default value is determined. The discharging process is ended when the period of the discharging process is longer than a default value. A soft-start operation is performed such that the heating device performs a starting process to heat up.

Some aspects of the present disclosure provide a heating device which includes a first capacitor, a first switch, a second switch, a second capacitor, a third capacitor, a coil and a controller. The first capacitor is coupled to the power source. The second switch is coupled to the first switch in series at a first node, and the first switch and the second switch are coupled with the first capacitor in parallel. The second capacitor is coupled with the first switch in parallel. The third capacitor is coupled to the second switch, and is coupled to the second capacitor in series at a second node. The coil is coupled between the first node and the second node, and is configured to generate the induced magnetic field. The controller is configured to output a first control signal and a second control signal to the first switch and the second switch, respectively, in which the first control signal and the second control signal are complementary to each other. In an initial period after the heating device received the voltage and a starting command, the controller outputs the first control signal to turn on or off the first switch, and outputs the second control signal to turn on or off the second switch, in which the duty cycle of the second signal is lower than 50%, such that the first capacitor can be discharged through the second capacitor, the coil and the second switch which is turned on.

Some aspects of the present disclosure provide a heating device control method, in which the heating device includes a first switch, a second switch, a first capacitor, a second capacitor, a third capacitor, a coil and a controller, the heating device generates an induced magnetic field according to a voltage provided by a power source, the second switch is coupled to the first switch in series at a first node, the first capacitor is coupled to the power source and is coupled with the first switch and the second switch in parallel, the second capacitor is coupled with the first switch in parallel, the third capacitor is coupled to the second switch and is coupled to the second capacitor in series at a second node, the coil is coupled between the first node and the second node and is configured to generate the induced magnetic field, the controller is coupled to the first switch and the second switch, the control method includes the following operations. The voltage is received by the heating device. After receiving a starting command a first control signal is outputted by the controller to turn on or off the first switch, and a second control signal is outputted by the controller to turn on or off the second switch, to perform a discharging process, in which the first control signal and the second control signal are complementary to each other, and the duty cycle of the second control signal is lower than 50%, such that the first capacitor can be discharged through the second capacitor, the coil and the second switch which is turned on. Whether a period of the discharging process is longer than a default value is determined. The discharging process is ended when the period of the discharging process is longer than a default value. A soft-start operation is performed such that the heating device performs a starting process to heat up.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
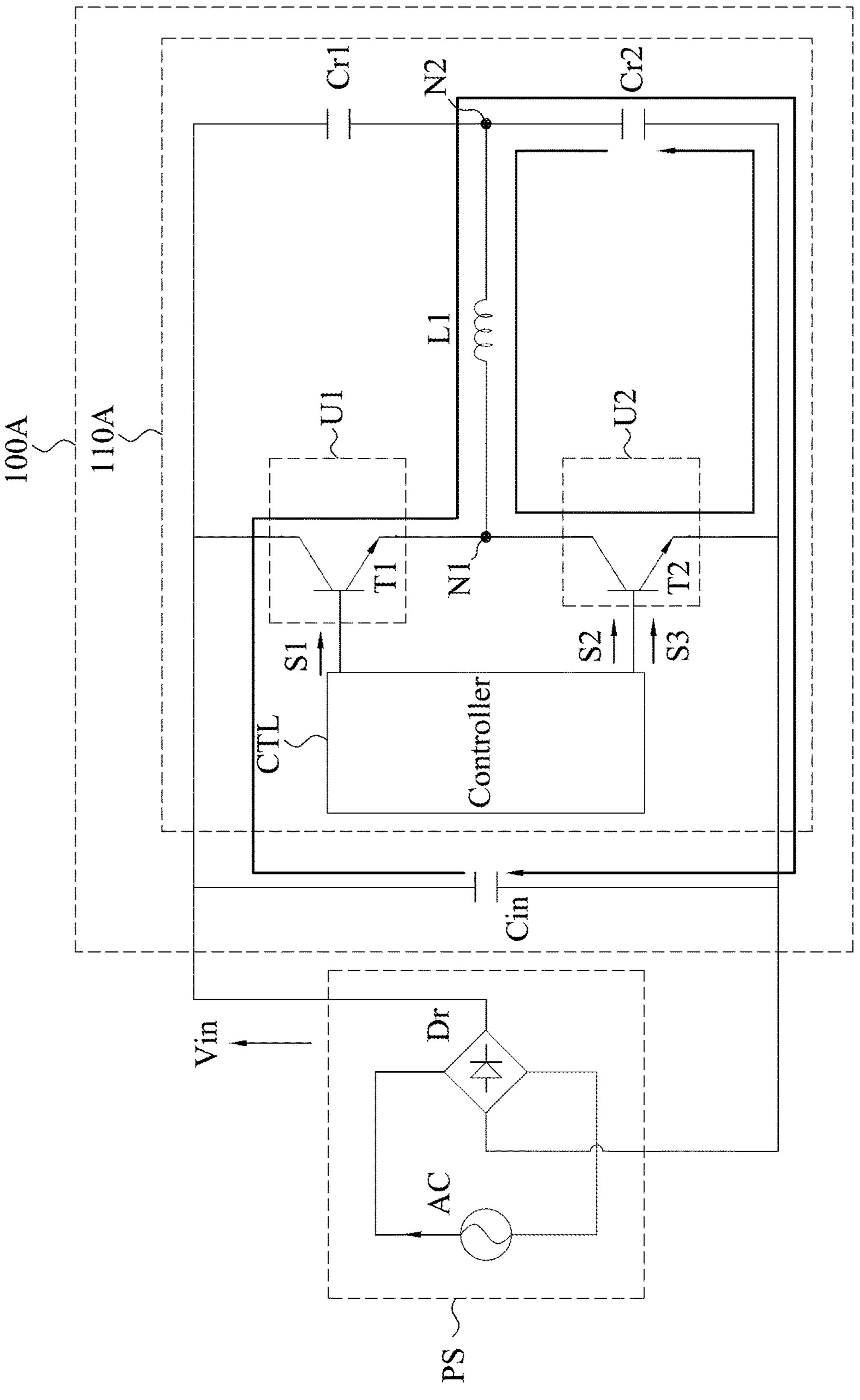
FIG. 1A is a schematic diagram illustrating a heating device, in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms first, second, third etc. may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present disclosure.

The terms herein are used for describing particular embodiments and are not intended to be limited thereto. Single forms such as "a", "this", "the", as used herein also include the plurality form.

In the description herein and throughout the claims that follow, the terms "coupled" or "connected" in this document may be used to indicate that two or more elements physically or electrically contact with each other, directly or indirectly. They may also be used to indicate that two or more elements cooperate or interact with each other.

In the description herein and throughout the claims that follow, the terms "comprise" or "comprising," "include" or "including," "have" or "having," "contain" or "containing" and the like used herein are to be understood to be open-ended, i.e., to mean including but not limited to.

In the description herein and throughout the claims that follow, the phrase "and/or" includes any and all combinations of one or more of the associated listed claims.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the description herein, the drawings, and throughout the claims that follow, index 1~n in component numbers or signal numbers, are only used for the convenience of referring to individual components and signals, but not intended to limit the number of the aforementioned components and signals to a specific amount.

In the specification and drawings herein, if a component number or a signal number is used without specifying the index, it means that the component number or signal number refers to any unspecified component or signal which belongs to the component group or signal group. For example, the component number 2101 refers to the control circuit 2101, and the component number 210 refers to an unspecified control circuit of the control circuits 2101~210*n*.

Reference is now made to FIG. 1A. FIG. 1A is a schematic diagram illustrating a heating device 100A, in accordance with some embodiments of the present disclosure. As shown in FIG. 1A, the heating device 100A includes a capacitor Cin and a control circuit 110A coupled in parallel. In some embodiments, the control circuit 110A includes a switch U1, a switch U2, a capacitor Cr1, a capacitor Cr2, a coil L1, and a controller CTL. The switch U1 and the switch U2 are coupled in series at a node N1, and are coupled with the capacitor Cin in parallel. The capacitor Cr1 and the capacitor Cr2 are coupled in series at a node N2, and are coupled to the switch U1 and the switch U2 respectively. The coil L1 is coupled between the node N1 and the node N2, and is configured to generate an induced magnetic field. The heating device 100A is configured to generate the induced magnetic field according to the input voltage Vin provided by the power source PS.

In some embodiments, the power source PS includes an input source AC and a rectifier circuit Dr coupled to the input source AC. In some other embodiments, the power source PS can only include the input source AC, and the rectifier circuit Dr is implemented in the heating device. The input source AC can be the AC power from the utility power, and the rectifier circuit Dr can be a half bridge circuit or a full bridge circuit, in which the rectifier circuit Dr is coupled to two terminals of the capacitor Cin and is configured to convent AC power to DC power (e.g., input voltage Vin).

In some embodiments of FIG. 1A, the switch U1 and the switch U2 including a transistor (e.g., a transistor T1 and a transistor T2), respectively, and the coil L1 as a component (e.g., an inductor) which can be configured to generate induced magnetic field, will be taken for example in the following description. However, in some other embodiments, the capacitor Cin, the capacitor Cr1 and the capacitor Cr2 can include one or more components coupled together which can be configured to store energy, the switch U1 and the switch U2 can include one or more transistors or components coupled together which can be configured to be turned on or off, and the coil L1 can include one or more components coupled together which can be configured to generate the induced magnetic field, and the present disclosure are not limited thereto.

In some embodiments, the control signal S1 and the control signal S2 are configured to control the switch U1 and the switch U2 to be turned on or off, respectively. In some embodiments, the control signal S1 and the control signal S2 are complementary pulse width modulation signal, which can be generated by the controller CTL. In other words, the sum of the duty cycle of the control signal S1 and the duty cycle of the control signal S2 is 100%.

In some embodiments, when the heating device 100 receives the input voltage Vin provided by the power source PS (or called power-up) and initiates according to a starting command (e.g., the power plug of the heating device is plugged into a power socket to receive the voltage provided by the utility power and the starting command is inputted by the user to start the heating device 100A), the controller CTL can output the control signal S1 and the control signal S2 respectively to turn on or of the switch U1 and the switch U2 correspondingly. When the switch U1 is turned on and the switch U2 is turned off, the capacitor Cr1 and the coil L1 form a resonant circuit. On the contrary, when the switch U2 is turned on and the switch U1 is turned off, the capacitor Cr2 and the coil L1 form a resonant circuit. Accordingly, the current can be controlled to flow through the coil L1 and a induced magnetic field is generated by the coil L1 according to the current to perform heating on the pot placed on the coil L1.

During the process of power-up, the capacitor Cin, the capacitor Cr1, and the capacitor Cr2 are fully charged in a very short time and become open circuits. When the heating device 100 initiates directly and the switch U1 or the switch U2 is turned on, there will be an instantaneous excessive current flowing through the coil L1, which cause the pot placed on the heating device 100 to generate noise. Accordingly, in some embodiments, when the heating device 100 receives the voltage (or is powered up), the capacitor Cin, the capacitor Cr1, and the capacitor Cr2 are charged to be open circuits in a very short time. Meanwhile, the switch U1 or the switch U2 can be controlled to be turned on to form a loop, by the control signal S1 and the control signal S2, such that the capacitor Cin, the capacitor Cr1, or the capacitor Cr2 can release energy.

In some embodiments, the capacitor Cin is coupled to the power source PS, which keeps it charged continuously. Therefore, the capacitor Cin can only be discharged when the heating device 100A receives the starting command. In some embodiments, the starting command can be sent by program instruction(s), and can also be sent by a user start command and received by a microprocessor, in which the present disclosure is not limited thereto. During an initial period (e.g., in 1 micro second) after the heating device 100A receives the input voltage Vin and initiates according to the starting command, the controller CTL can output the control signal S1 and the control signal S2, which are complementary to each other, to control the switch U1 and the switch U2 to be turned on or off, to discharge the capacitor Cin. After the initial period, the controller CTL performs a soft-start operation, such that the heating device 100A can perform a normal-start operation. In some embodiments, in the initial period, the switch U1 is controlled by the control signal S1 with lower duty cycle (e.g., lower than 50%, preferably 3%-8%), by the controller CTL. Meanwhile, the capacitor Cin can be discharged through the switch U1 which is turned on, the coil L1, and the capacitor Cr2.

In some embodiments, before receiving the starting command, the controller CTL can output the control signal S3 to control the switch U2 to be turned on or off for in a period (e.g., in a second), such that the capacitor Cr2 can be discharged through the coil L1 and the switch U2 which is turned on, without performing on the switch U1. The duty cycle of the control signal S3 is lower than 50%, preferably 3%-8%.

By aforementioned circuits and control signals, the capacitor Cr2 can be discharged before the heating device 100A initiates, and the capacitor Cin can be controlled to be discharged in accordance with the control signals after receiving the starting command, so as to avoid the noise caused by the instantaneous excessive current flowing through the coil L1 when the heating device 100A is initiated.

Figure 1B:
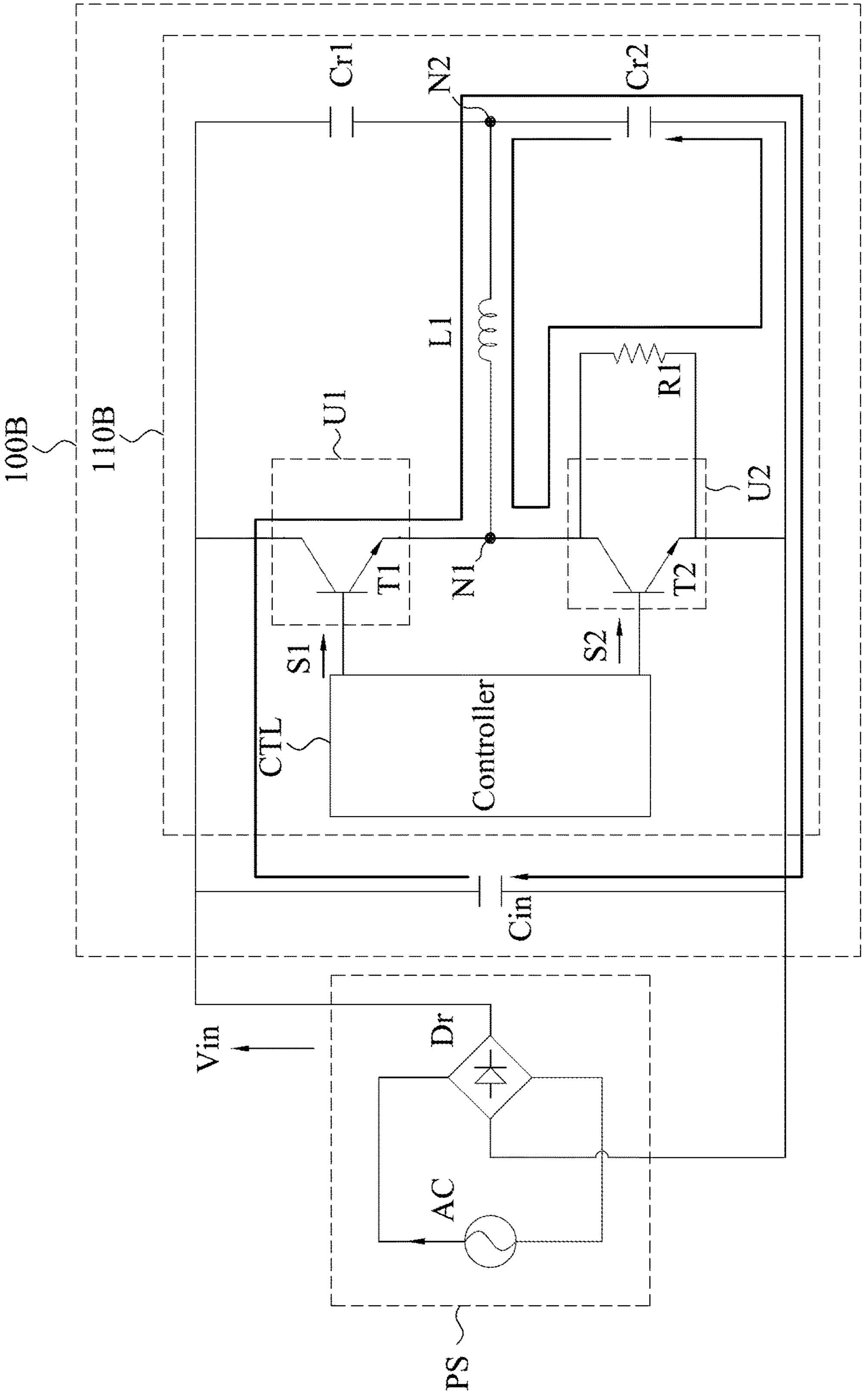
FIG. 1B is a schematic diagram illustrating a heating device, in accordance with some other embodiments of the present disclosure.

Reference is now made to FIG. 1B. FIG. 1B is a schematic diagram illustrating a heating device 100B, in accordance with some other embodiments of the present disclosure. Difference between FIG. 1B and FIG. 1A is that the control circuit 110 in FIG. 1B further includes a resistor R1. In some embodiments, the resistor R1 is coupled with the switch U2 in parallel such that the capacitor Cr2 can be discharged through the coil L1 and the resistor R1 when the heating device 100B is powered up.

In some embodiments, the resistor R1 can be coupled with the capacitor Cr2 in parallel (not shown in figure), such that the capacitor Cr2 can release energy only through the resistor R1 without the coil L1.

Figure 1C:
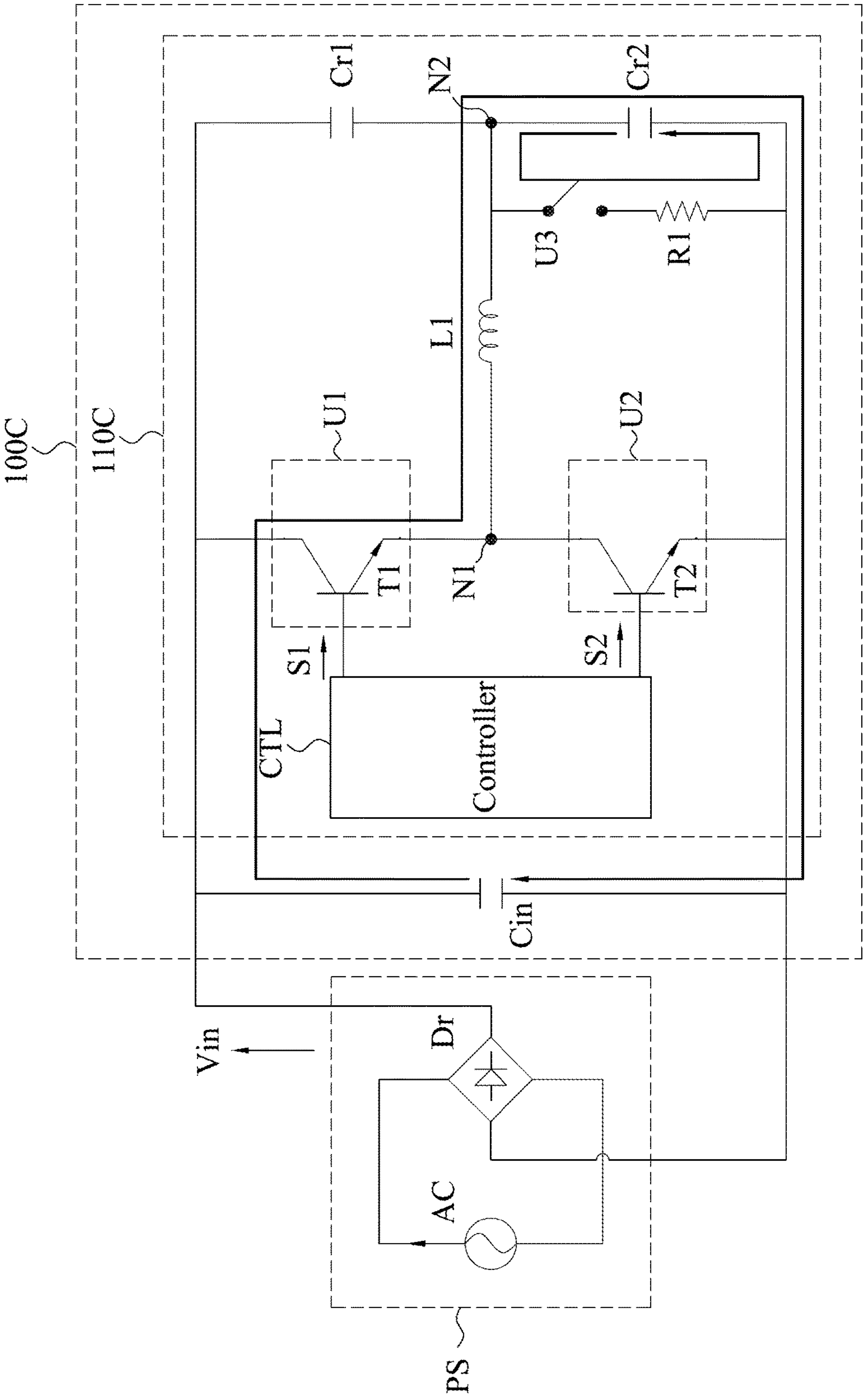
FIG. 1C is a schematic diagram illustrating a heating device, in accordance with some other embodiments of the present disclosure.

Reference is now made to FIG. 1C. FIG. 1C is a schematic diagram illustrating a heating device 100C, in accordance with some other embodiments of the present disclosure. Difference between FIG. 1C and FIG. 1A is that the control circuit 110C in FIG. 1C further includes a resistor R1 and a switch U3. The resistor R1 is coupled to the switch U3 in series, and the resistor R1 and the switch are coupled with the capacitor Cr2 in parallel. By controlling the switch U3 to be turned on after the heating device 100C receives the input voltage Vin and before receiving the starting command, such that the capacitor Cr2 can release energy through the resistor R1. After receiving the starting command, the switch U3 is controlled to be turned off to avoid unnecessary power consumption.

Figure 1D:
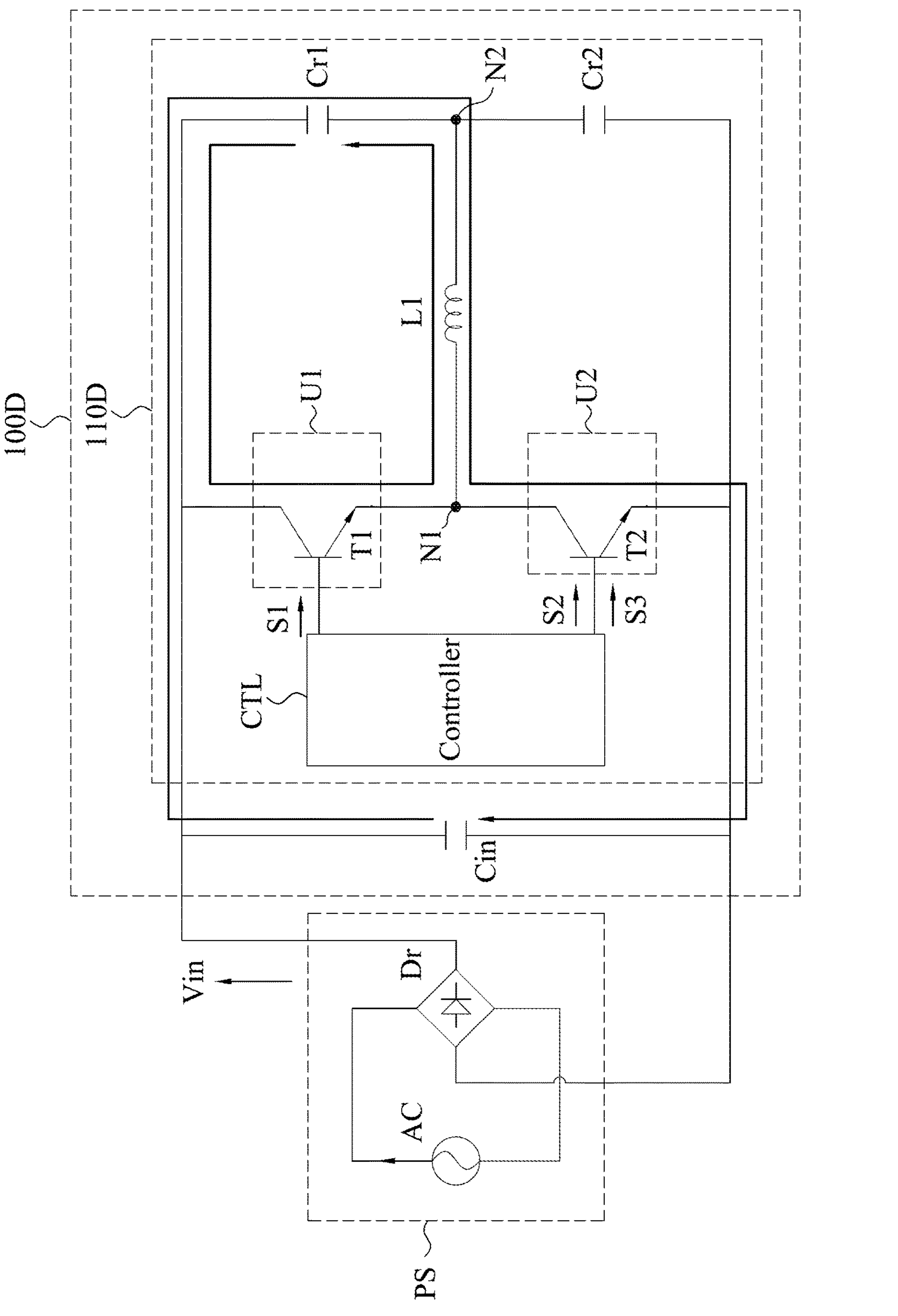
FIG. 1D is a schematic diagram illustrating a heating device, in accordance with some other embodiments of the present disclosure.

Reference is now made to FIG. 1D. FIG. 1D is a schematic diagram illustrating a heating device 100D, in accordance with some other embodiments of the present disclosure. Except for the discharging components and discharging path of the control circuit 110D in FIG. 1D, other portion of the heating device 100D in FIG. 1D is the same as the heating device 100A in FIG. 1A, which will not be described repeatedly herein.

During the initial period (e.g., in 1 ms) after the heating device 100D receives the input voltage Vin and initiates according to the starting command, the controller CTL can output the control signal S land S2, which are complementary to each other, to control the switch U1 and the switch U2 to be turned on or off, to discharge the capacitor Cin. After the initial period, the controller CTL performs a soft-start operation, such that the heating device 100A can perform normal-start operation. In this embodiments, within the initial period, the switch U2 is controlled by the controller CTL with the control signal S2 with lower duty cycle (e.g., lower than 50%, preferably 3%-8%). Meanwhile, the capacitor Cin can be discharged through the capacitor Cr1, the coil L1, and the switch U2 which is turned on.

In some embodiments, before receiving the starting command, the controller CTL can output the control signal S3 to control the switch U1 to be turned on or off for a while (e.g., in one second), such that the capacitor Cr1 can be discharged through the coil L1 and the switch U1 which is turned on. At this time, the switch U2 does not need to operate, and the duty cycle of the control signal S3 is lower than 50%, preferably 3%~8%.

Figure 1E:
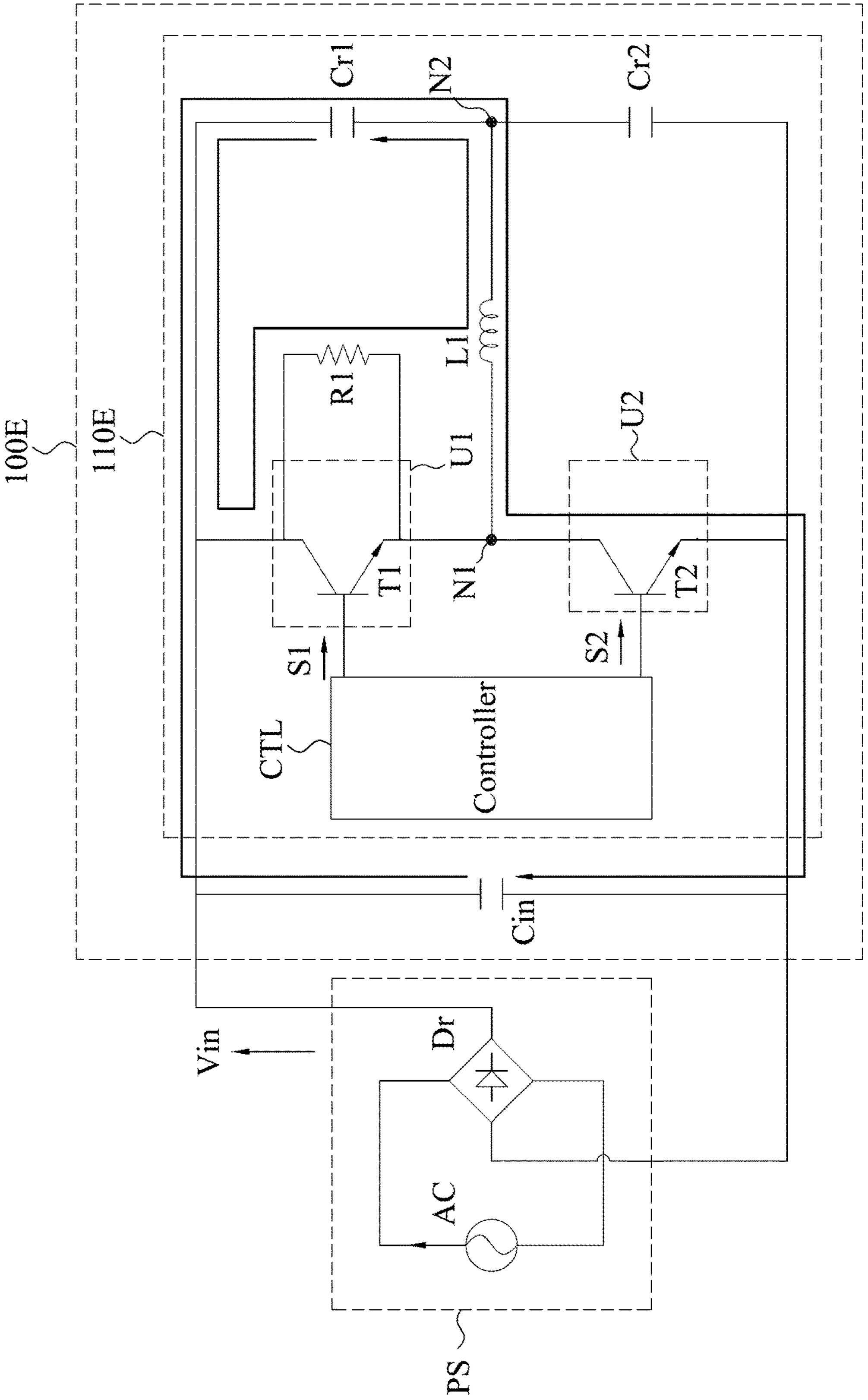
FIG. 1E is a schematic diagram illustrating a heating device, in accordance with some other embodiments of the present disclosure.
Figure 1F:
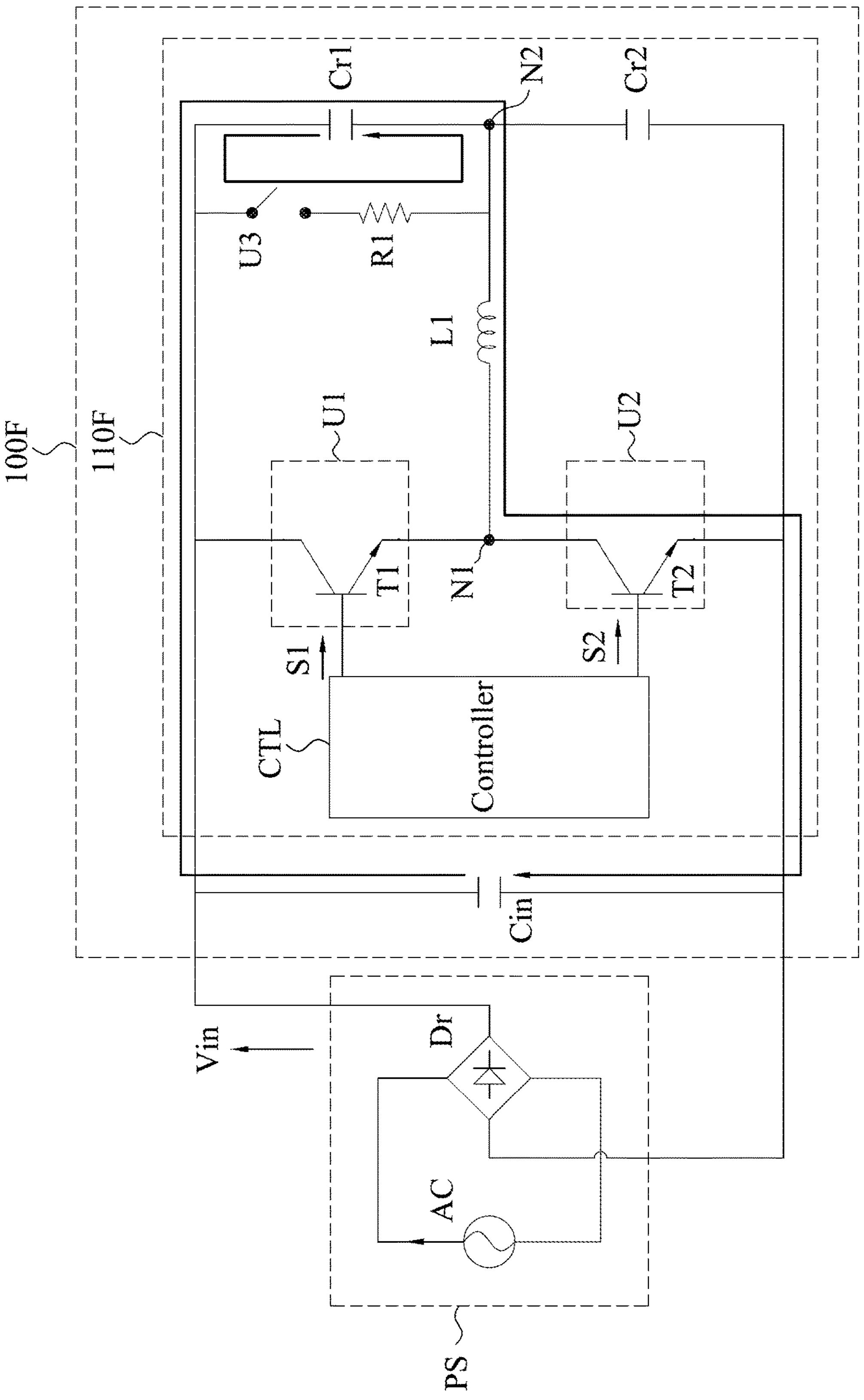
FIG. 1F is a schematic diagram illustrating a heating device, in accordance with some other embodiments of the present disclosure.

FIG. 1E is a schematic diagram illustrating a heating device 100E, in accordance with some other embodiments of the present disclosure. FIG. 1F is a schematic diagram illustrating a heating device 100F, in accordance with some other embodiments of the present disclosure. Except for the position of the resistor R1 and/or the switch U3, the discharging operations on the capacitor Cr1 of the heating device 100E and the heating device 100F are similar to the discharging operations on the capacitor Cr2 of the heating device 100B and the heating device 100C, which will not be described repeatedly herein.

Figure 2:
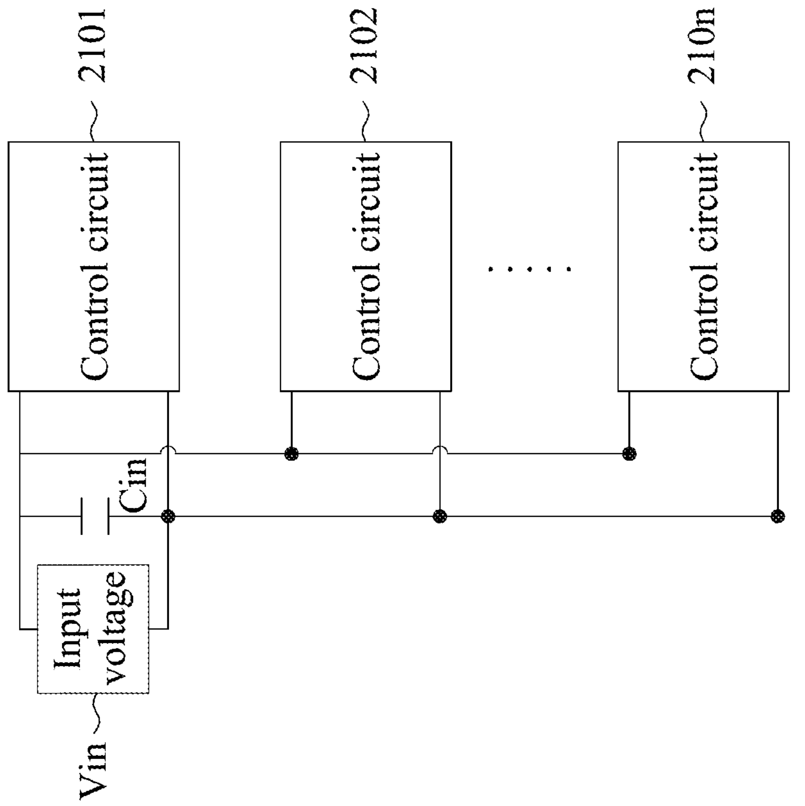
FIG. 2 is a schematic diagram illustrating a heating device, in accordance with some other embodiments of the present disclosure.

Reference is now made to FIG. 2. FIG. 2 is a schematic diagram illustrating a heating device 200, in accordance with some other embodiments of the present disclosure. Difference between FIG. 2 and FIG. 1A is that the heating device 200 in FIG. 2 includes multiple control circuits 2101~210*n*, and the control circuits 2101~210*n* are coupled with each other in parallel, and are coupled with the capacitor Cin and the input voltage Vin in parallel. Specifically, the heating device 200 includes multiple coils (not shown in figure), which can provide various heating ways for different pots. In some embodiments, the components and the coupling relationships of each control circuit 2101~210*n* have been described in the above paragraphs, which will not be described repeatedly herein.

It is noted that, each of the control circuit 210 of the heating device 200 is coupled with the same capacitor Cin in parallel, so it can be controlled to be turned on or off independently. When the heating device 200 is releasing energy, the control circuits 2101~210*n* need to discharge the capacitor Cr1 or the capacitor Cr2 respectively, while after the heating device 200 received the starting command, the capacitor Cin needs to be discharged only once. In other words, after one of the control circuits 210 initiates, the discharging process of the capacitor Cin is complete, so that each one of other control circuits 210 that initiates later only needs to discharge the capacitor Cr1 or the capacitor Cr2 before they initiate, without the need to discharge the capacitor Cin again after they initiate.

Figure 3:
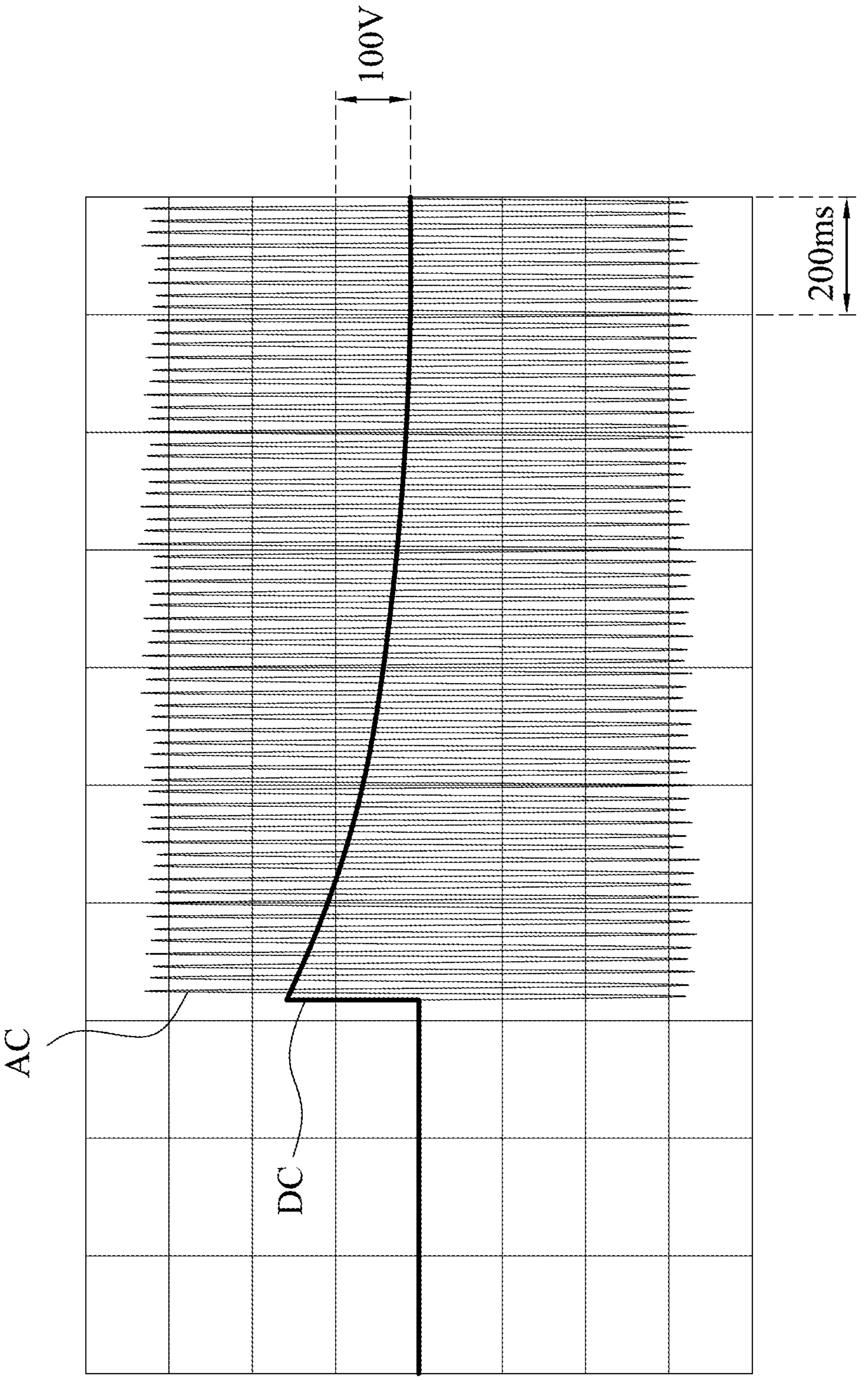
FIG. 3 is a schematic diagram illustrating a capacitor discharging curve, in accordance with some other embodiments of the present disclosure.
Figure 4:
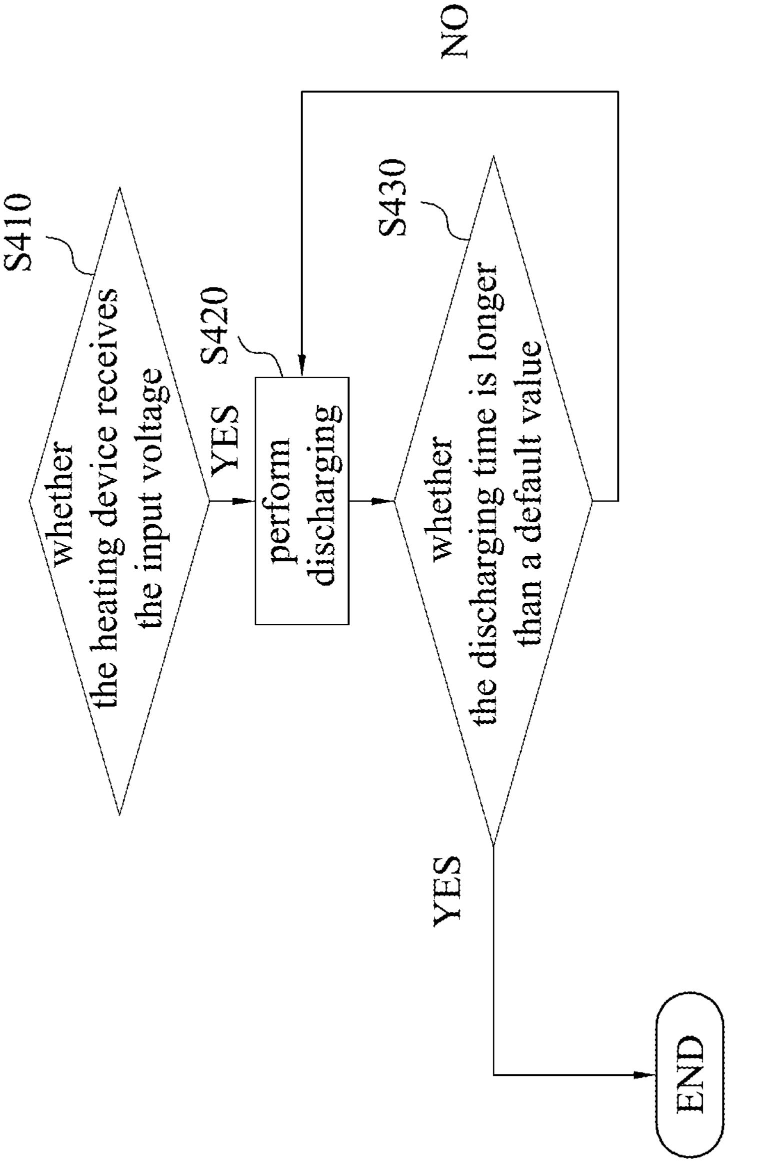
FIG. 4 is a flowchart illustrating a control method of capacitor discharging, in accordance with some other embodiments of the present disclosure.

Reference is now made to FIG. 3 and FIG. 4. FIG. 3 is a schematic diagram illustrating a discharging curve of the capacitor Cr2, in accordance with some other embodiments of the present disclosure. FIG. 4 is a flowchart illustrating a control method of capacitor discharging, in accordance with some other embodiments of the present disclosure. The control method illustrated in FIG. 4 can be applied to the heating devices 100A~100F, and the heating device 100A will be taken for example in the following description. As shown in FIG. 4, in step 410, whether the heating device 100A receives the input voltage Vin is determined. In step S420, if the heating device 100A receives the input voltage Vin, the switch U2 is controlled to be turned on or off, such that the capacitor Cr2 can be discharged when the switch U2 is turned on. In step S430, whether the discharging time is longer than a default value (e.g., 1 second) is determined by the controller CTL. For example, in some embodiments, as shown in FIG. 3, when the heating device 100A receives the input source AC (e.g., the utility power), the voltage DC of the capacitor Cr2 can be charged to maximum value in a very short time. Meanwhile, if the switch U2 is controlled by the control signal S3 with 8% duty cycle for about 1 second, the voltage DC of the capacitor Cr2 drops to almost zero. Therefore, if the controller CTL determines that the discharging time of the capacitor Cr2 is not higher than the aforementioned default value, step S420 will be performed again, such that the capacitor Cr2 can keep being discharged until the discharging time is long enough (not lower than the aforementioned default value).

Figure 5:
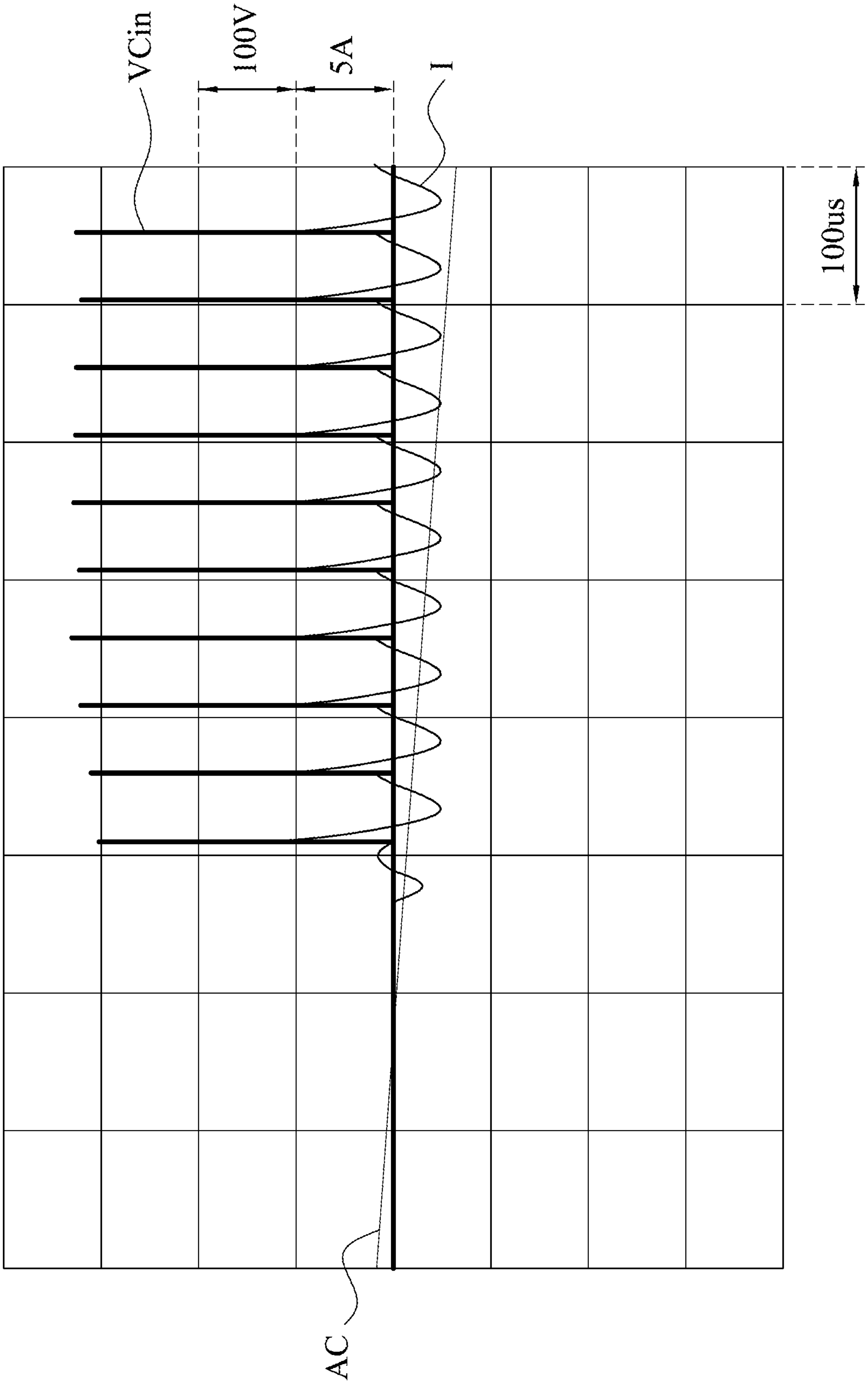
FIG. 5 is a schematic diagram illustrating a capacitor discharging curve, in accordance with some other embodiments of the present disclosure.
Figure 6:
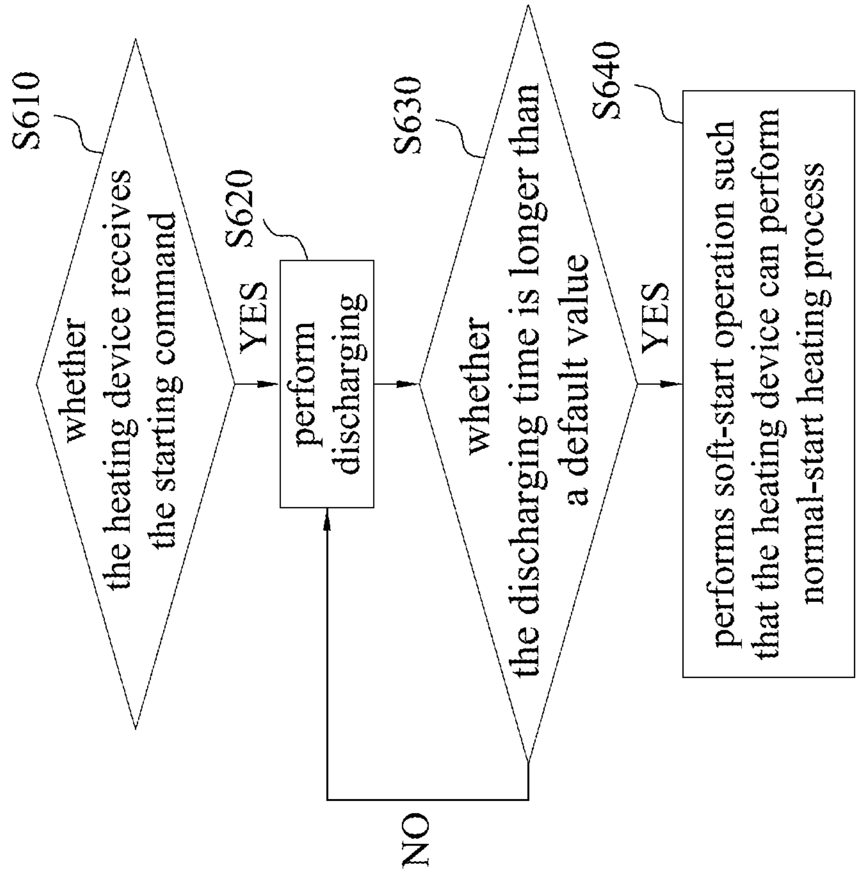
FIG. 6 is a flowchart illustrating a control method of capacitor discharging, in accordance with some other embodiments of the present disclosure.

Reference is now made to FIG. 5 and FIG. 6. FIG. 5 is a schematic diagram illustrating discharging curve of the capacitor Cin, in accordance with some other embodiments of the present disclosure. FIG. 6 is a flowchart illustrating a control method of capacitor discharging, in accordance with some other embodiments of the present disclosure. In some embodiments, as shown in FIG. 6, whether the heating device 100A receives the starting command is determined in step 610. If the heating device 100A receives the starting command, step S620 is performed. In step S620, the control signal S1 and the control signal S2, which are complementary to each other, are outputted to control the switch U1 and the switch U2 to be turned on or off to discharge the capacitor Cin. The heating device 100A is taken for example. The switch U1 is controlled by the controller CTL through the control signal S1 with lower duty cycle (e.g., lower than 50%, preferably 3%~8%), so that the capacitor Cin can be discharged through the switch U1 which is turned on, the coil L1, and the capacitor Cr2.

In step S630, whether the discharging time of the capacitor Cin is longer than a default value (i.e., whether the initial period is passed through) is determined by the controller CTL. If the controller CTL determines that the discharging time of the capacitor Cin is longer than a default value, it means that the discharging process of the capacitor Cin is complete, and step S640 will be performed. In step S640, the controller CTL performs a soft-start operation, such that the heating device 100A can perform normal-start heating process.

As shown in FIG. 5, after the discharging process of the capacitor Cr2 is finished, the capacitor Cin receives the starting command so that the voltage VCin of the capacitor Cin can be discharged with the current I lower than 5 A which flowing through the coil. Compared with the current (approximately 80 A) generated by performing the starting process directly without discharging the capacitor Cin and the capacitor Cr2, the current I is lower enough to avoid generating the noise to the pot placed on the heating device 100A.

It is noted that, the heating device 100B-100F in aforementioned paragraphs can also be applied to discharging process shown in FIG. 4 and FIG. 6, and have discharging curve similar to that in FIG. 3 and FIG. 5, which will not be described repeatedly herein for simplicity of illustration.

In summary, the heating device and the control method thereof in the present disclosure can discharge the capacitor in the heating device by controlling the switches to be turned on or off with the control signals, or by applying an additional resistor(s), such that the instantaneous excessive current flowing through the coils(s) in the heating device can be reduced, to avoid noise and vibration.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A heating device configured to generate an induced magnetic field according to a voltage provided by a power source, comprising:

a first capacitor coupled to the power source;

a first switch;

a second switch coupled to first switch in series at the first node, and the first switch and the second switch are coupled with the first capacitor in parallel;

a second capacitor coupled to the first switch;

a third capacitor coupled to the second switch, and coupled to the second capacitor in series at a second node;

a coil coupled between the first node and the second node, and configured to generate the induced magnetic field;

a resistor coupled with the first switch in parallel; and a controller configured to output a first control signal and a second control signal to the first switch and the second switch, respectively, wherein the first control signal and the second control signal are complementary to each other;

wherein after the heating device receives the voltage, the second capacitor is discharged through the coil and the resistor, and after the third capacitor is discharged, the controller is configured to output the first control signal to turn on or off the first switch, and output the second control signal to turn on or off the second switch, wherein a duty cycle of the second control signal is lower than 50%, such that the first capacitor is discharged through the second capacitor, the coil and the second switch which is turned on.

2. A control method for controlling the heating device as claimed in claim 1, wherein the control method comprises:

receiving, by the heating device, the voltage provided by the power source;

discharging the second capacitor through the coil and the resistor;

after the second capacitor is discharged, a first control signal is outputted by the controller to turn on or off the first switch and the second control signal is outputted by the controller to turn on or off the second switch, to perform a discharging process for the first capacitor, wherein the first control signal and the second control signal are complementary to each other, and the duty cycle of the second control signal is lower than 50%, such that the first capacitor is discharged through the second capacitor, the coil and the second switch which is turned on;

determining if a period of the discharging process for the first capacitor is longer than a default value;

when the period of the discharging process for the first capacitor is longer than the default value, ending the discharging process for the first capacitor; and performing a soft-start operation to start the heating device.

3. A heating device, configured to generate an induced magnetic field according to a voltage provided by a power source, comprising:

a first capacitor coupled to the power source;

a first switch;

a second switch coupled to the first switch in series at a first node, and the first switch and the second switch are coupled with the first capacitor in parallel;

a second capacitor coupled to the first switch;

a third capacitor coupled to the second switch, and coupled to the second capacitor in series at a second node;

a coil coupled between the first node and the second node, and configured to generate the induced magnetic field;

a resistor coupled with the first switch in parallel; and a controller configured to output a first control signal and a second control signal to the first switch and the second switch, respectively, wherein the first control signal and the second control signal are complementary to each other;

wherein after the heating device receives the voltage the second capacitor is discharged through the coil and the resistor.

4. The heating device of claim 3, wherein a duty cycle of the first control signal is lower than 50%.

5. The heating device of claim 3, wherein a duty cycle of the first control signal is ranges between 3% and 8%.

6. A heating device, configured to generate an induced magnetic field according to a voltage provided by a power source, comprising:

a first capacitor coupled to the power source;

a first switch;

a second switch coupled to the first switch in series at a first node, and the first switch and the second switch are coupled with the first capacitor in parallel;

a second capacitor coupled to the first switch;

a third capacitor coupled to the second switch, and coupled to the second capacitor in series at a second node;

a coil coupled between the first node and the second node, and configured to generate the induced magnetic field;

a resistor coupled with the first switch in parallel; and a controller configured to output a first control signal and a second control signal to the first switch and the second switch, respectively;

wherein after the heating device receives the voltage, the second capacitor is discharged through the coil and the resistor, and after the second capacitor is discharged, the controller is configured to output the first control signal to the first switch and output the second control signal to the second switch, wherein the first control signal and the second control signal are complementary to each other.

* * * * *